(12) United States Patent
Yu et al.

(10) Patent No.: US 10,659,311 B2
(45) Date of Patent: May 19, 2020

(54) METHOD AND APPARATUS FOR PROCESSING DELIVERY DATA, AND STORAGE MEDIUM

(71) Applicant: Baidu Online Network Technology (Beijing) Co., Ltd., Beijing (CN)

(72) Inventors: Tao Yu, Beijing (CN); Jun Ye, Beijing (CN); Aixuan Xia, Beijing (CN); Yufeng Ma, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/534,409

(22) PCT Filed: Dec. 10, 2015

(86) PCT No.: PCT/CN2015/096884
§ 371 (c)(1),
(2) Date: Jun. 8, 2017

(87) PCT Pub. No.: WO2017/054319
PCT Pub. Date: Apr. 6, 2017

(65) Prior Publication Data
US 2018/0198685 A1 Jul. 12, 2018

(30) Foreign Application Priority Data

Sep. 30, 2015 (CN) .......................... 2015 1 0639785

(51) Int. Cl.
*G06F 16/951* (2019.01)
*H04L 12/24* (2006.01)
(Continued)

(52) U.S. Cl.
CPC .............. *H04L 41/14* (2013.01); *G06F 16/00* (2019.01); *G06Q 30/0277* (2013.01);
(Continued)

(58) Field of Classification Search
CPC .. G06F 16/951; G06F 16/24578; G06F 16/00; G06Q 30/0246; H04L 67/22; H04L 41/14; H04L 67/02
See application file for complete search history.

(56) References Cited

U.S. PATENT DOCUMENTS

2009/0132524 A1* 5/2009 Stouffer ................ G06F 16/951
2015/0046787 A1 2/2015 Rubin et al.
2015/0213484 A1* 7/2015 Amara ............... G06Q 30/0246
705/14.45

FOREIGN PATENT DOCUMENTS

CN 101079768 A * 11/2007
CN 101079768 A 11/2007
(Continued)

OTHER PUBLICATIONS

International Search Report corresponding to International Patent Application No. PCT/CN2015/096884, State Intellectual Property Office of the P.R. China, dated Jul. 1, 2016; (2 pages).

*Primary Examiner* — Kyung H Shin
(74) *Attorney, Agent, or Firm* — Nixon Peabody LLP

(57) ABSTRACT

Embodiments of the present invention provide a method and apparatus for processing advertisement data, and a storage medium. The method includes: executing the following steps in a browser application: obtaining a jump web page link of delivery data to be loaded, where the jump web page link includes a uniform resource locator of a data delivery platform website and identification information of the delivery data; sending delivery data loading request according to the jump web page link, so as to load and present a web page of the delivery data; detecting a loading completion status of jumping from the jump web page link to an arrival web page link including the identification information; and storing the
(Continued)

jump web page link, the arrival web page link, and information about the loading completion status in an association.

15 Claims, 3 Drawing Sheets

(51) Int. Cl.
    *G06F 16/00*     (2019.01)
    *G06Q 30/02*     (2012.01)
    *H04L 29/08*     (2006.01)

(52) U.S. Cl.
    CPC ............ *H04L 41/085* (2013.01); *H04L 67/22* (2013.01); *H04L 67/02* (2013.01)

(56) References Cited

FOREIGN PATENT DOCUMENTS

| | | |
|---|---|---|
| CN | 101661600 A | 3/2010 |
| CN | 101808002 A | 8/2010 |
| CN | 103246739 A | 8/2013 |
| CN | 104639958 A | 5/2015 |

\* cited by examiner

METHOD AND APPARATUS FOR PROCESSING DELIVERY DATA, AND STORAGE MEDIUM

CROSS-REFERENCE TO RELATED APPLICATION

This application is a U.S. National Stage of International Application No. PCT/CN2015/096884, filed Dec. 10, 2015, which is related to and claims priority from Chinese Application Ser. No. 201510639785.1, filed on Sep. 30, 2015, entitled "Method and Apparatus for Processing Advertisement Data", the entire disclosures of which are hereby incorporated by reference in their entireties.

TECHNICAL FIELD

The present invention relates to the field of Internet technology, and particularly to method and apparatus for processing advertisement data, and a storage medium.

BACKGROUND

With the development of Internet and mobile Internet technologies, most merchants choose to deliver advertisements through advertisement delivery platforms. For example, advertisers publish advertisement links on advertisement delivery platforms to guide users to their websites. The advertising effect is evaluated by tracking users' behaviors.

Generally, the advertising effect is tracked based on cookies stored on users' local terminals. The principle of this method is as follows: After a user clicks an advertisement jump link, the user receives content returned by an accounting receiving server. The accounting receiving server generally is a server of an advertisement delivery platform. Here, the advertisement jump link is an address that jumps to the accounting receiving server. In the above-mentioned process, the accounting receiving server records, in the user cookies, advertisement-associated information corresponding to the advertisement jump link, and when returning data, informs a browser or application used by the user of the target advertisement address to which it is redirected or jumps to. Statistics-collecting code for tracking the advertisement needs to be embedded at the target address of the advertisement. The statistics-collecting code can read advertisement-associated information that is previously written to the user's cookies by the accounting receiving server. If the user successfully jumps to the web page corresponding to the target address of the advertisement, the statistics-collecting code returns the advertisement-associated information in the cookies, together with a message indicating successful arrival, to a statistics server. In this way, the advertising effect can be determined based on the data returned.

However, this method has the following shortcomings. First, if the user deletes cookies, uses the privacy protection mode, or sets a Do Not Track function for the browser, this method will become ineffective. Second, when the user clicks multiple advertisement jump links within a short period of time, advertisement-associated information may be overwritten by the latter advertisement click operation, affecting the accuracy of evaluation of the advertising effect.

SUMMARY

An objective of embodiments of the present invention is to provide a method and apparatus for processing delivery data, and storage medium, to implement the storage of a jump web page link, an arrival web page link, and information about a loading completion status in an association when a user or website adopts an anti-tracking technology, thereby providing a more accurate data basis for the evaluation of the delivery effect.

To achieve the above-mentioned objective of the present invention, an embodiment of the present invention provides a method for processing delivery data, comprising: executing the following steps in a browser application: obtaining a jump web page link of delivery data to be loaded, wherein the jump web page link comprises a uniform resource locator of a data delivery platform website and identification information of the delivery data; sending delivery data loading request according to the jump web page link, so as to load and present a web page of the delivery data; detecting a loading completion status of jumping from the jump web page link to an arrival web page link comprising the identification information; and storing the jump web page link, the arrival web page link, and information about the loading completion status in an association.

Preferably, the processing of sending delivery data loading request according to the jump web page link, so as to load and present a web page of the delivery data comprises: sending the delivery data loading request by transferring the jump web page link to a browser kernel of the browser application, so as to load and present the web page of the delivery data.

Preferably, the processing of detecting a loading completion status of jumping from the jump web page link to an arrival web page link comprising the identification information comprises: obtaining, from the browser kernel, the arrival web page link and information about the loading completion status of the arrival web page link.

Preferably, the loading completion status is a successful loading state or a failed loading state.

Preferably, the processing of storing the jump web page link, the arrival web page link, and information about the loading completion status in an association comprises: generating a log record that comprises the jump web page link, the arrival web page link, and the information about the loading completion status.

Preferably, before the generating a log record that comprises the jump web page link, the arrival web page link, and the information about the loading completion status, the method further comprises:

obtaining a user identifier and adding the user identifier to the jump web page link.

Preferably, the method further comprises: sending the generated log record to a server of the data delivery platform website periodically at a predetermined time interval.

An embodiment of the present invention further provides an apparatus for processing delivery data, comprising: a web page link obtaining module, configured to obtain a jump web page link of delivery data to be loaded, wherein the jump web page link comprises a uniform resource locator of a data delivery platform website and identification information of the delivery data; a loading request sending module, configured to send delivery data loading request according to the jump web page link, so as to load and present a web page of the delivery data; a loading status detection module, configured to detect a loading completion status of jumping from the jump web page link to an arrival web page link comprising the identification information; and a web page information storage module, configured to store the jump web page link, the arrival web page link, and information about the loading completion status in an association.

Preferably, the loading request sending module is configured to send the delivery data loading request by transferring the jump web page link to a browser kernel of the browser application, so as to load and present the web page of the delivery data.

Preferably, the loading status detection module is configured to obtain, from the browser kernel, the arrival web page link and information about the loading completion status of the arrival web page link.

Preferably, the loading completion status is a successful loading state or a failed loading state.

Preferably, the web page information storage module is configured to generate a log record that comprises the jump web page link, the arrival web page link, and the information about the loading completion status.

Preferably, the web page information storage module is further configured to obtain a user identifier and add the user identifier to the jump web page link, before generating the log record that comprises the jump web page link, the arrival web page link, and the information about the loading completion status.

Preferably, the apparatus further comprises: a log sending module, configured to send the generated log record to a server of the data delivery platform website periodically at a predetermined time interval.

An embodiment of the present invention further provides a non-transitory computer storage medium storing one or more modules, the one or more modules when executed by a device for executing a method for processing delivery data, causing the device to execute the following operations:

obtaining a jump web page link of delivery data to be loaded, wherein the jump web page link comprises a uniform resource locator of a data delivery platform website and identification information of the delivery data;

sending delivery data loading request according to the jump web page link, so as to load and present a web page of the delivery data;

detecting a loading completion status of jumping from the jump web page link to an arrival web page link comprising the identification information; and storing the jump web page link, the arrival web page link, and information about the loading completion status in an association.

The method and apparatus for processing delivery data, and storage medium that are provided in the embodiments of the present invention, by sending delivery data loading request according to an obtained jump web page link of delivery data to be loaded, so as to load and present a web page of the delivery data, and further detecting a loading completion status of jumping from the jump web page link to an arrival web page link comprising the identification information, implement the storage of a jump web page link, an arrival web page link, and information about a loading completion status in an association when a user performs an anti-tracking operation, thereby providing a more accurate data basis for the evaluation of the delivery effect, and improving the accuracy of evaluation of the delivery effect.

BRIEF DESCRIPTION OF THE DRAWINGS

After reading detailed descriptions of non-limiting embodiments with reference to the following accompanying drawings, other features, objectives and advantages of the present invention will be more apparent.

DETAILED DESCRIPTION OF EMBODIMENTS

The basic concept of the present invention is to provide a redirection-based method for processing delivery data: after obtaining a jump web page link of delivery data to be loaded, sending delivery data loading request according to the jump web page link, so as to load and present a web page of the delivery data, and detecting a loading completion status of jumping from the jump web page link to an arrival web page link including identification information of the delivery data. In this way, the jump web page link, the arrival web page link, and information about the loading completion status can be stored in an association.

Figure 1:
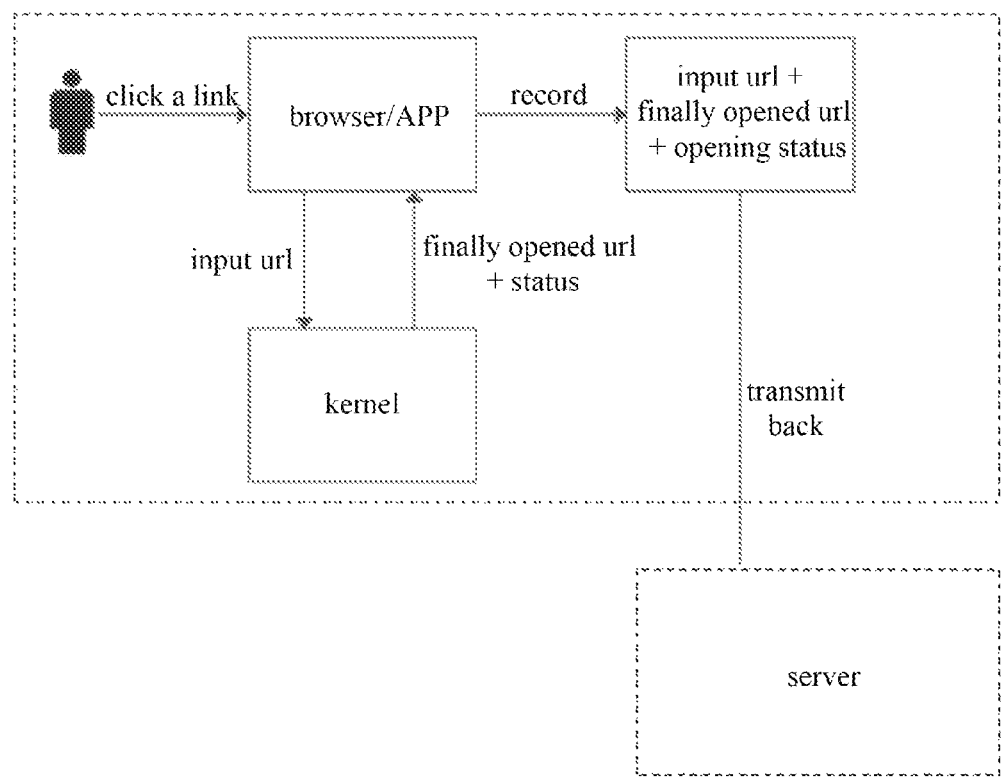
FIG. 1 is a schematic diagram of an example that reflects the general inventive concept of the present invention.

FIG. 1 is a schematic diagram of an example that reflects the general inventive concept of the present invention.

Referring to FIG. 1, assuming that a user clicks a jump web page link of specific delivery data, a browser or an application records the jump web page link (that is, an input URL), and sends the jump web page link to a browser kernel. The jump web page link includes a uniform resource locator of a data delivery platform website and identification information of the delivery data. After completing processing of the jump web page link, the browser kernel tracks an arrival web page link (that is, a finally opened URL) and an opening status thereof (whether the opening is successful or not). In this way, the input URL, the finally opened URL, and information about the opening status are stored in an association (for example, stored locally). Further, the recorded information may be sent to a server of the data delivery platform website. Accordingly, the server may analyze the recorded information, and obtain effect information indicating whether the delivery is successful, according to the identification information, whether the arrival web page is successfully opened, and so on.

Different from the implementation method in the prior art, the basic concept of the present invention neither needs to rely on cookies for recording nor requires embedding of statistics-collecting code on the arrival web page. Even if a user tries to prevent the website from tracking his/her behavior by deleting cookie, using the privacy protection mode, or setting a Do Not Track function for the browser, the user's behavior can still be tracked, that is, finally the jump web page link, the arrival web page link, and the information about the loading completion status can still be obtained. The delivery effect is evaluated based on the above-mentioned information, thereby greatly improving the accuracy of evaluation of the delivery effect.

The method and apparatus for processing delivery data according to the embodiments of the present invention are described in detail below with reference to the accompanying drawings.

Embodiment 1

Figure 2:
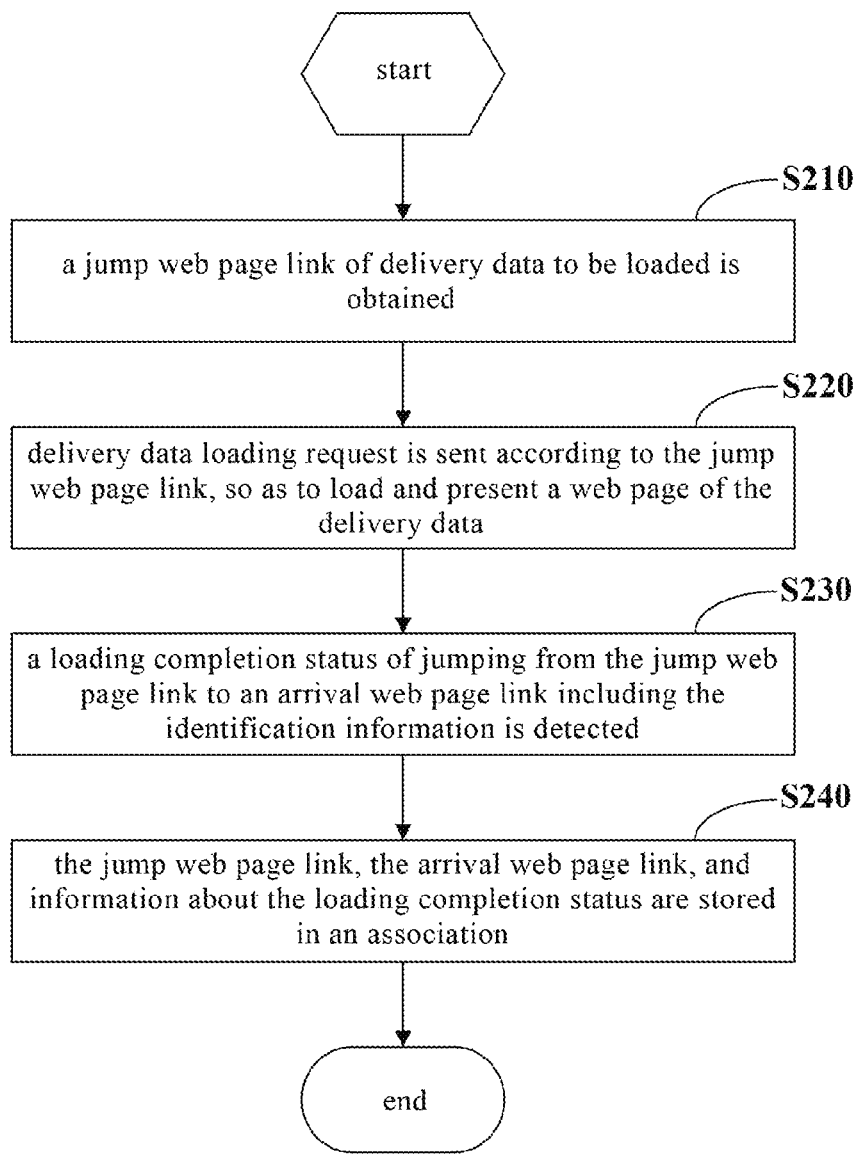
FIG. 2 is a flow chart of a method for processing delivery data according to Embodiment 1 of the present invention.

FIG. 2 is a flow chart of a method for processing delivery data according to Embodiment 1 of the present invention. The method may be executed in, for example, a browser application of a client.

Referring to FIG. 2, at step S210, a jump web page link of delivery data to be loaded is obtained.

Here, the jump web page link may include a uniform resource locator of a data delivery platform website and identification information of the delivery data. For example, a user clicks specific delivery data that is presented on Baidu in image, text or any other form, and an obtained jump web page link of the delivery data to be loaded is www.baidu.com/baidu.php?url=ABCDEF1234567890.

In this embodiment, the delivery data to be loaded may be advertisement data to be loaded, the data delivery platform website included in the jump web page link may be an accounting website, and the identification information of the delivery data included in the jump web page link may be an advertisement identifier.

In addition, a unique user identifier may further be added to the jump web page link to identify the user. In this way, in a subsequent process of evaluating the delivery effect, the server can put together a series of click behavior data of a same user chronologically or according to the order in which such data is recorded, thus obtaining a more comprehensive delivery effect.

At step S220, delivery data loading request is sent according to the jump web page link, so as to load and present a web page of the delivery data.

At step S230, a loading completion status of jumping from the jump web page link to an arrival web page link including the identification information is detected.

At step S240, the jump web page link, the arrival web page link, and information about the loading completion status are stored in an association.

According to an exemplary embodiment of the present invention, step S240 may include: generating a log record that includes the jump web page link, the arrival web page link, and the information about the loading completion status.

That is, a correspondence between the jump web page link, the arrival web page link, and the information about the loading completion status is established, so that they are stored in an association. Specifically, they may be saved in the log record.

In particular, as many open-source browser kernels provide abundant calling interfaces, browser application development personnel mostly implements the function of a browser application based on an existing browser kernel. Therefore, according to an exemplary embodiment of the present invention, step S220 may include: sending the delivery data loading request by transferring the jump web page link to a browser kernel of the browser application, so as to load and present the web page of the delivery data.

Correspondingly, according to an exemplary embodiment of the present invention, step S230 may include: obtaining, from the browser kernel, the arrival web page link and information about the loading completion status of the arrival web page link. It should be noted that the loading completion status may be a successful loading state or a failed loading state.

In a specific implementation, the browser application may load the jump web page link by calling a loadUrl Application Programming Interface (API) method that is provided by the browser kernel. When the loading of the jump web page link www.baidu.com/baidu.php?url=ABCDEF1234567890 is completed, the browser application obtains the arrival web page link and the information about the loading completion status of the arrival web page link by calling the browser kernel, for example, by using onPageFinished. For example, the arrival web page link is www.iqiyi.com, the information about the loading completion status is successful loading. In addition, the browser can detect that the jump web page link is inconsistent with the arrival web page link, that is, 302 redirection occurs. Finally, www.baidu.com/baidu.php?url=ABCDEF1234567890, www.iqiyi.com, and the information about the successful loading state are saved in an association.

After the processing of the foregoing steps S210 to S240, the method for processing delivery data may further include: sending the generated log record to a server of the data delivery platform website periodically at a predetermined time interval.

Then, after obtaining log records, the server of the data delivery platform website screens out the log record that meets requirements according to a delivery jump link feature. On one hand, the server parses the jump web page link to obtain specific information about the delivery data such as the identification information of the delivery data, and may further obtain delivered service information according to the identification information of the delivery data. On the other hand, the server analyzes the arrival web page link and the information about the loading completion status, to obtain delivery effect data such as the arrival rate.

The method for processing delivery data provided in this embodiment of the present invention, by sending delivery data loading request according to an obtained jump web page link of delivery data to be loaded, so as to load and present a web page of the delivery data, and further detecting a loading completion status of jumping from the jump web page link to an arrival web page link including the identification information, implement the storage of a jump web page link, an arrival web page link, and information about a loading completion status in an association.

Compared with the prior art, this embodiment of the present invention neither needs to rely on cookies for recording nor requires embedding of statistics-collecting code on the arrival web page. Even if a user performs an anti-tracking operation to prevent tracking of his/her behaviors, behavior data (that is, the jump web page link, the arrival web page link, and the information about the loading completion status) of the user can still be tracked. More accurate information about the delivery effect can further be obtained based on the above-mentioned information, thereby improving the accuracy of evaluation of the delivery effect.

Embodiment 2

Figure 3:
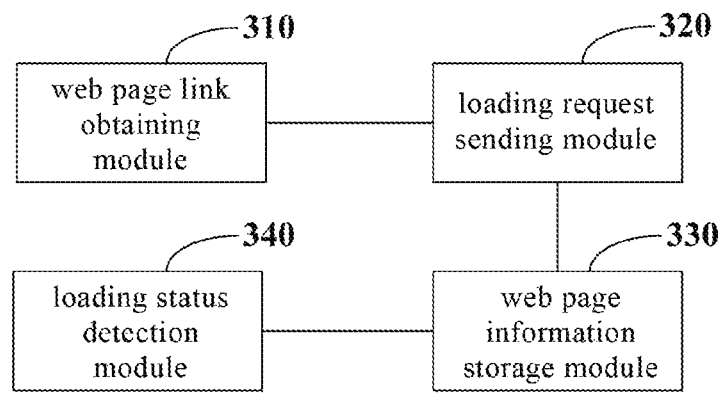
FIG. 3 is a logical block diagram of an apparatus for processing delivery data according to Embodiment 2 of the present invention.

FIG. 3 is a logical block diagram of an apparatus for processing delivery data according to Embodiment 2 of the present invention. The apparatus may be used to execute the steps of the method according to the embodiment shown in FIG. 2.

Referring to FIG. 3, the apparatus for processing delivery data includes a web page link obtaining module 310, a loading request sending module 320, a loading status detection module 330, and a web page information storage module 340.

The web page link obtaining module 310 is configured to obtain a jump web page link of delivery data to be loaded. The jump web page link may include a uniform resource locator of a data delivery platform website and identification information of the delivery data.

The loading request sending module 320 is configured to send delivery data loading request according to the jump web page link, so as to load and present a web page of the delivery data.

Specifically, the loading request sending module 320 may be configured to send the delivery data loading request by transferring the jump web page link to a browser kernel of the browser application, so as to load and present the web page of the delivery data.

The loading status detection module 330 is configured to detect a loading completion status of jumping from the jump web page link to an arrival web page link including the identification information.

Preferably, the loading status detection module 330 may be configured to obtain, from the browser kernel, the arrival web page link and information about the loading completion status of the arrival web page link. Here, the loading completion status may be a successful loading state or a failed loading state.

The web page information storage module 340 is configured to store the jump web page link, the arrival web page link, and information about the loading completion status in an association. Further, the web page information storage module 340 may be configured to generate a log record that includes the jump web page link, the arrival web page link, and the information about the loading completion status.

Further, the web page information storage module 340 is further configured to obtain a user identifier and add the user identifier to the jump web page link, before generating the log record that includes the jump web page link, the arrival web page link, and the information about the loading completion status.

Still further, the apparatus may further include: a log sending module (not shown), configured to send the generated log record to a server of the data delivery platform website periodically at a predetermined time interval.

The apparatus for processing delivery data provided in this embodiment of the present invention, after obtaining a jump web page link of delivery data to be loaded, sends delivery data loading request according to the jump web page link, so as to load and present a web page of the delivery data, and further detects a loading completion status of jumping from the jump web page link to an arrival web page link including the identification information, thereby storing the jump web page link, the arrival web page link, and information about the loading completion status in an association. This provides an accurate data basis for the evaluation of the delivery effect, thus improving the accuracy of evaluation of the delivery effect.

Embodiment 3

This embodiment provides a non-transitory computer storage medium storing one or more modules, the one or more modules when executed by a device for executing a method for processing delivery data, causing the device to execute the following operations:

obtaining a jump web page link of delivery data to be loaded, where the jump web page link includes a uniform resource locator of a data delivery platform website and identification information of the delivery data;

sending delivery data loading request according to the jump web page link, so as to load and present a web page of the delivery data;

detecting a loading completion status of jumping from the jump web page link to an arrival web page link including the identification information; and storing the jump web page link, the arrival web page link, and information about the loading completion status in an association.

When the one or more modules stored in the above-mentioned storage medium are executed by the device, the processing of sending delivery data loading request according to the jump web page link, so as to load and present a web page of the delivery data includes:

sending the delivery data loading request by transferring the jump web page link to a browser kernel of the browser application, so as to load and present the web page of the delivery data.

When the one or more modules stored in the above-mentioned storage medium are executed by the device, the processing of detecting a loading completion status of jumping from the jump web page link to an arrival web page link including the identification information includes:

obtaining, from the browser kernel, the arrival web page link and information about the loading completion status of the arrival web page link.

When the one or more modules stored in the above-mentioned storage medium are executed by the device, the loading completion status is a successful loading state or a failed loading state.

When the one or more modules stored in the above-mentioned storage medium are executed by the device, the processing of storing the jump web page link, the arrival web page link, and information about the loading completion status in an association includes:

generating a log record that includes the jump web page link, the arrival web page link, and the information about the loading completion status.

When the one or more modules stored in the above-mentioned storage medium are executed by the device, before the generating a log record that includes the jump web page link, the arrival web page link, and the information about the loading completion status, the method further includes:

obtaining a user identifier and adding the user identifier to the jump web page link.

When the one or more modules stored in the above-mentioned storage medium are executed by the device, the method further includes:

sending the generated log record to a server of the data delivery platform website periodically at a predetermined time interval.

Embodiment 4

Figure 4:
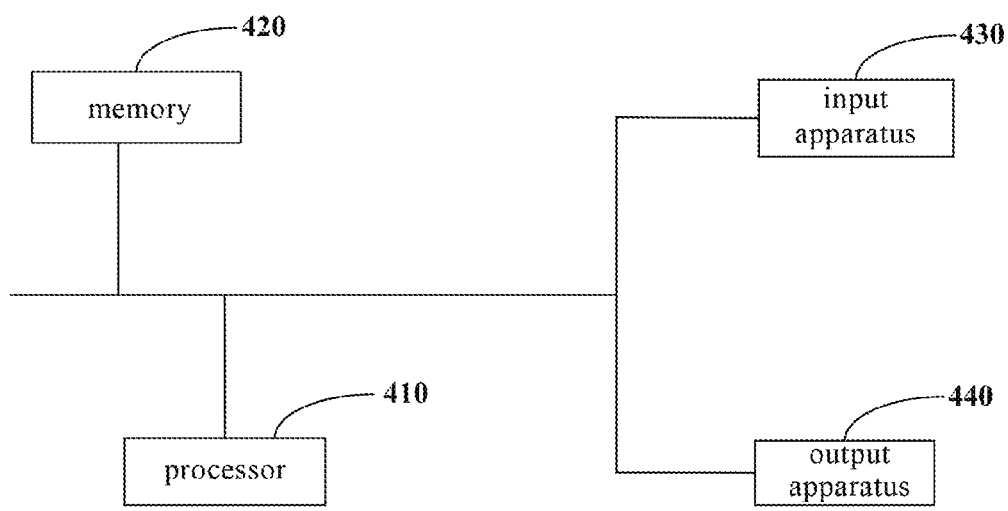
FIG. 4 is a schematic diagram of a hardware structure of a device for executing a method for processing delivery data according to Embodiment 4 of the present invention.

FIG. 4 is a schematic diagram of a hardware structure of a device for executing a method for processing delivery data according to Embodiment 4 of the present invention.

The device includes:

one or more processors 410, where one processor 410 is used as an example in FIG. 4;

a memory 420; and one or more modules.

The device may further include an input apparatus 430 and an output apparatus 440. The processor 410, the memory 420, the input apparatus 430, and the output apparatus 440 in the device may be connected by a bus or in other manners. Connection by a bus is used as an example in FIG. 4.

As a computer readable storage medium, the memory 420 may be used to store software programs, computer executable programs, and modules, for example, program instructions/modules corresponding to the method for processing delivery data in the embodiments of the present invention (for example, the web page link obtaining module 310, the loading request sending module 320, the loading status detection module 330, and the web page information storage module 340 shown in FIG. 3). The processor 410 runs the software programs, instructions and modules stored in the memory 420 to execute various functional applications and data processing of a browser, that is, implement the method for processing delivery data of the above method embodiment.

The memory 420 may include a program storage area and a data storage area. The program storage area may store an operating system and applications required for at least one function. The data storage area may store data and the like created according to use of a terminal device. In addition, the memory 420 may include a high-speed random access memory, and may also include a non-volatile memory, such as at least one disk storage device, a flash memory device or other non-transitory solid-state storage devices. In some embodiments, the memory 420 may further include memories remotely arranged relative to the processor 410, where the remote memories may be connected to the terminal device by a network. An example of the above network includes but not limited to the Internet, an enterprise intranet, a local area network, a mobile communications network, and a combination thereof.

The input apparatus 430 may be used for receiving inputted digit or character information, and generating a key signal input related to the user setting and function control of the terminal device. The output apparatus 440 may include a display screen and other display devices.

The one or more modules are stored in the memory 420. When executed by the one or more processors 410, the one or more modules cause the one or more processors 410 to execute the following operations:

obtaining a jump web page link of delivery data to be loaded, where the jump web page link includes a uniform resource locator of a data delivery platform website and identification information of the delivery data;

sending delivery data loading request according to the jump web page link, so as to load and present a web page of the delivery data;

detecting a loading completion status of jumping from the jump web page link to an arrival web page link including the identification information; and storing the jump web page link, the arrival web page link, and information about the loading completion status in an association.

Further, the processing of sending delivery data loading request according to the jump web page link, so as to load and present a web page of the delivery data includes:

sending the delivery data loading request by transferring the jump web page link to a browser kernel of the browser application, so as to load and present the web page of the delivery data.

Further, the processing of detecting a loading completion status of jumping from the jump web page link to an arrival web page link including the identification information includes:

obtaining, from the browser kernel, the arrival web page link and information about the loading completion status of the arrival web page link.

Further, the loading completion status is a successful loading state or a failed loading state.

Further, the processing of storing the jump web page link, the arrival web page link, and information about the loading completion status in an association includes:

generating a log record that includes the jump web page link, the arrival web page link, and the information about the loading completion status.

Further, before the generating a log record that includes the jump web page link, the arrival web page link, and the information about the loading completion status, the method further includes:

obtaining a user identifier and adding the user identifier to the jump web page link.

Further, the method further includes:

sending the generated log record to a server of the data delivery platform website periodically at a predetermined time interval.

It should be appreciated that the apparatus and method disclosed in the several embodiments of the present invention may be implemented in other manners. For example, the above-mentioned embodiments of the apparatus are merely schematic. For example, the division of the modules is only a logical functional division, and other manners of division may also be used during actual implementation.

In addition, the functional modules in the embodiments of the present invention may be integrated in one processing module, or may exist physically as separate modules, or two or more modules may be integrated in one module. The integrated module may be implemented either by means of hardware or by means of hardware and software functional modules.

If the above-described integrated module is implemented by means of a software functional module, it may be stored in a computer readable storage medium. The software functional module is stored in a storage medium, which includes some instructions to cause a computer device (which may be a personal computer, a server, a network device or the like) or a processor to execute all or some of the steps of the method in the embodiments of the present invention. The aforementioned storage medium includes various media which can store program code such as a USB flash drive, a removable hard disk, a read-only memory (ROM), a random access memory (RAM), a magnetic disk or an optical disc.

The above descriptions are merely specific implementations of the present invention, but the protection scope of the present invention is not limited thereto. Any variations or replacements that can be easily conceived of by those skilled in the art within the technical scope disclosed by the present invention shall be encompassed by the protection scope of the present invention. Therefore, the protection scope of the present invention shall be subject to the protection scope of the claims.

What is claimed is:

1. A method for processing delivery data, comprising: executing the following steps in a browser application:
    capturing, from displayed contents of a first web page, a jump web page link of delivery data to be loaded, wherein the jump web page link comprises a uniform resource locator of a data delivery platform website and identification information of the delivery data;
    sending delivery data loading request according to the jump web page link, so as to load and present a web page of the delivery data, a web page link of the first web page being different from the jump web page link;
    detecting a loading completion status of jumping from the jump web page link to an arrival web page link comprising the identification information, the arrival web page link being different from the jump web page link and from the web page link of the first web page; and
    associatively storing the jump web page link, the arrival web page link, and information about the loading completion status.

2. The method according to claim 1, wherein the sending delivery data loading request according to the jump web page link, so as to load and present a web page of the delivery data comprises:

sending the delivery data loading request by transferring the jump web page link to a browser kernel of the browser application, so as to load and present the web page of the delivery data.

3. The method according to claim 2, wherein the detecting a loading completion status of jumping from the jump web page link to an arrival web page link comprising the identification information comprises:

obtaining, from the browser kernel, the arrival web page link and information about the loading completion status of the arrival web page link.

4. The method according to claim 1, wherein the loading completion status is a successful loading state or a failed loading state.

5. The method according to claim 4, wherein the storing the jump web page link, the arrival web page link, and information about the loading completion status in an association comprises:

generating a log record that comprises the jump web page link, the arrival web page link, and the information about the loading completion status.

6. The method according to claim 5, wherein before the generating a log record that comprises the jump web page link, the arrival web page link, and the information about the loading completion status, the method further comprises:

obtaining a user identifier and adding the user identifier to the jump web page link.

7. The method according to claim 5, wherein the method further comprises:

sending the generated log record to a server of the data delivery platform website periodically at a predetermined time interval.

8. An apparatus for processing delivery data, comprising:
at least one processor; and
a memory storing instructions, which when executed by the at least one processor, cause the at least one processor to perform operations, the operations comprising:

capturing, from displayed contents of a first web page, a jump web page link of delivery data to be loaded, wherein the jump web page link comprises a uniform resource locator of a data delivery platform website and identification information of the delivery data;

sending delivery data loading request according to the jump web page link, so as to load and present a web page of the delivery data, a web page link of the first web page being different from the jump web page link;

detecting a loading completion status of jumping from the jump web page link to an arrival web page link comprising the identification information, the arrival web page link being different from the jump web page link and from the web page link of the first web page; and associatively storing the jump web page link, the arrival web page link, and information about the loading completion status.

9. The apparatus according to claim 8, wherein the sending delivery data loading request according to the jump web page link, so as to load and present a web page of the delivery data comprises:

sending the delivery data loading request by transferring the jump web page link to a browser kernel of the browser application, so as to load and present the web page of the delivery data.

10. The apparatus according to claim 9, wherein the detecting a loading completion status of jumping from the jump web page link to an arrival web page link comprising the identification information comprises:

obtaining, from the browser kernel, the arrival web page link and information about the loading completion status of the arrival web page link.

11. The apparatus according to claim 8, wherein the loading completion status is a successful loading state or a failed loading state.

12. The apparatus according to claim 11, wherein the storing the jump web page link, the arrival web page link, and information about the loading completion status in an association comprises:

generating a log record that comprises the jump web page link, the arrival web page link, and the information about the loading completion status.

13. The apparatus according to claim 12, wherein before the generating a log record that comprises the jump web page link, the arrival web page link, and the information about the loading completion status, the operations further comprise:

obtaining a user identifier; and adding the user identifier to the jump web page link, before generating the log record that comprises the jump web page link, the arrival web page link, and the information about the loading completion status.

14. The apparatus according to claim 12, wherein the operations further comprise:

sending the generated log record to a server of the data delivery platform website periodically at a predetermined time interval.

15. A non-transitory computer storage medium storing one or more modules, the one or more modules when executed by a device for executing a method for processing delivery data, causing the device to execute the following operations:

capturing, from displayed contents of a first web page, a jump web page link of delivery data to be loaded, wherein the jump web page link comprises a uniform resource locator of a data delivery platform website and identification information of the delivery data;

sending delivery data loading request according to the jump web page link, so as to load and present a web page of the delivery data, a web page link of the first web page being different from the jump web page link;

detecting a loading completion status of jumping from the jump web page link to an arrival web page link comprising the identification information, the arrival web page link being different from the jump web page link and from the web page link of the first web page; and associatively storing the jump web page link, the arrival web page link, and information about the loading completion status.

* * * * *